United States Patent
El-Barbari et al.

(10) Patent No.: US 10,300,791 B2
(45) Date of Patent: May 28, 2019

(54) TROLLEY INTERFACING DEVICE HAVING A PRE-CHARGING UNIT

(71) Applicant: General Electric Company, Schenectady, NY (US)

(72) Inventors: Said Farouk El-Barbari, Munich (DE); Alvaro Jorge Mari Curbelo, Munich (DE); Paolo Soldi, Munich (DE); Simon Herbert Schramm, Moosach (DE)

(73) Assignee: GE GLOBAL SOURCING LLC, Norwalk, CT (US)

( * ) Notice: Subject to any disclaimer, the term of this patent is extended or adjusted under 35 U.S.C. 154(b) by 418 days.

(21) Appl. No.: 14/973,740

(22) Filed: Dec. 18, 2015

(65) Prior Publication Data
US 2017/0174087 A1 Jun. 22, 2017

(51) Int. Cl.
*B60L 11/18* (2006.01)
*B60L 3/04* (2006.01)
(Continued)

(52) U.S. Cl.
CPC .................. *B60L 3/04* (2013.01); *B60L 5/18* (2013.01); *B60L 9/04* (2013.01); *B60L 9/18* (2013.01);
(Continued)

(58) Field of Classification Search
CPC .. B60L 11/182; B60L 11/1816; B60L 11/1805
(Continued)

(56) References Cited

U.S. PATENT DOCUMENTS 3,727,118 A * 4/1973 Makino ................ H02H 7/0844
318/297
3,867,686 A * 2/1975 St-Jean .............. G01R 31/3336
315/191
(Continued)

FOREIGN PATENT DOCUMENTS

CN 203372078 U 1/2014
CN 103825458 A 5/2014
WO 2009033574 A1 3/2009

OTHER PUBLICATIONS

Berry, "DC-DC Converters and Highly Capacitive Loads", EDN Network, 6 Pages, Jan. 16, 2014.

*Primary Examiner* — Robert J Grant
*Assistant Examiner* — John T Trischler
(74) *Attorney, Agent, or Firm* — Christopher R. Carroll; The Small Patent Law Group LLC

(57) ABSTRACT

A trolley interfacing device for interfacing a traction load to a voltage source is presented. The trolley interfacing device includes a first charging unit coupled in parallel to the voltage source. Further, the trolley interfacing device includes a second charging unit coupled in parallel to the traction load, where the second charging unit includes at least one inductor. Also, the trolley interfacing device includes a pre-charging unit coupled in parallel to the second charging unit and configured to pre-charge the first charging unit with a voltage across the at least one inductor prior to electrically coupling the first charging unit to the voltage source. In addition, the trolley interfacing device includes a voltage converting unit disposed between the first charging unit and the second charging unit and configured to step down a voltage provided by the voltage source to the traction load.

18 Claims, 6 Drawing Sheets

(51) Int. Cl.
  *H02J 7/34*    (2006.01)
  *B60L 5/18*    (2006.01)
  *B60L 9/04*    (2006.01)
  *B60L 9/18*    (2006.01)

(52) U.S. Cl.
  CPC ......... *B60L 11/182* (2013.01); *B60L 11/1805* (2013.01); *B60L 11/1816* (2013.01); *H02J 7/345* (2013.01); *B60L 2200/30* (2013.01); *B60L 2210/10* (2013.01); *B60L 2270/20* (2013.01); *Y02T 10/7216* (2013.01)

(58) Field of Classification Search
  USPC ........................................................ 320/108
  See application file for complete search history.

(56) References Cited

U.S. PATENT DOCUMENTS

| | | | | |
|---|---|---|---|---|
| 4,539,515 A * | 9/1985 | Morishita | ............. | H02J 7/1423 307/16 |
| 4,885,974 A * | 12/1989 | Honig | ............. | F41B 6/006 124/3 |
| 5,165,006 A * | 11/1992 | Nagano | ............. | B60L 11/1805 388/803 |
| 5,483,142 A * | 1/1996 | Skibinski | ............. | H02H 9/001 320/166 |
| 5,528,445 A * | 6/1996 | Cooke | ............. | B60L 3/003 361/18 |
| 5,654,621 A * | 8/1997 | Seelig | ............. | B60L 11/182 320/108 |
| 6,534,208 B1 * | 3/2003 | Zinser | ............. | B60L 11/1881 429/432 |
| 6,938,555 B2 * | 9/2005 | Jockel | ............. | B60L 7/06 105/34.1 |
| 6,982,499 B1 * | 1/2006 | Kachi | ............. | B60L 11/1851 307/46 |
| 6,984,946 B2 * | 1/2006 | Donnelly | ............. | B60L 3/102 105/61 |
| 7,124,691 B2 * | 10/2006 | Donnelly | ............. | B60L 3/0046 105/26.05 |
| 7,180,759 B2 | 2/2007 | Liptak et al. | | |
| 7,304,402 B2 * | 12/2007 | Osawa | ............. | B60L 3/0046 307/10.1 |
| 7,508,164 B2 * | 3/2009 | Miyagi | ............. | H01M 2/1077 320/112 |
| 7,940,016 B2 * | 5/2011 | Donnelly | ............. | B60L 7/04 318/139 |
| 8,022,663 B2 * | 9/2011 | Davis | ............. | B60L 7/24 320/104 |
| 8,076,797 B2 * | 12/2011 | Kramer | ............. | B60L 11/005 307/43 |
| 8,089,177 B2 * | 1/2012 | Kato | ............. | B60W 20/13 307/10.1 |
| 8,143,856 B2 * | 3/2012 | Andrea | ............. | H02M 7/797 320/109 |
| 8,253,273 B2 * | 8/2012 | Fredette | ............. | H02M 1/10 307/51 |
| 8,288,031 B1 * | 10/2012 | Matejek | ............. | B60L 3/0046 320/112 |
| 8,325,463 B2 * | 12/2012 | Peterson | ............. | H02N 11/002 320/166 |
| 8,421,381 B2 * | 4/2013 | Fukatsu | ............. | B60L 11/1811 318/139 |
| 8,575,940 B2 * | 11/2013 | Yugou | ............. | B60L 3/04 307/10.1 |
| 8,587,279 B2 | 11/2013 | Wang et al. | | |
| 8,606,447 B2 | 12/2013 | Namuduri et al. | | |
| 8,615,341 B2 * | 12/2013 | Kitanaka | ............. | B60L 3/003 701/22 |
| 8,716,987 B2 * | 5/2014 | Pauritsch | ............. | H02J 7/0065 323/266 |
| 8,779,735 B2 | 7/2014 | Roessler et al. | | |
| 8,816,641 B2 * | 8/2014 | Andrea | ............. | H02M 7/797 320/111 |
| 8,896,263 B2 * | 11/2014 | Riggio | ............. | H02J 7/00 320/104 |
| 8,897,041 B2 * | 11/2014 | Taddeo | ............. | H02M 1/10 363/123 |
| 8,922,054 B2 * | 12/2014 | Sihler | ............. | H02J 3/32 307/19 |
| 8,981,710 B2 * | 3/2015 | Hintz | ............. | B60L 11/005 320/103 |
| 9,000,721 B2 * | 4/2015 | Hernandez | ............. | B60L 11/1824 320/109 |
| 9,223,372 B2 * | 12/2015 | Hintz | ............. | B60L 11/005 |
| 9,233,612 B2 * | 1/2016 | Kumar | ............. | B60L 9/16 |
| 9,242,567 B2 * | 1/2016 | Kim | ............. | B60L 11/1811 |
| 9,270,182 B2 * | 2/2016 | Gailla | ............. | B60L 11/1816 |
| 9,440,539 B2 * | 9/2016 | Lee | ............. | B60L 7/16 |
| 9,446,756 B2 * | 9/2016 | Chen | ............. | B60L 1/003 |
| 9,573,474 B2 * | 2/2017 | Mensah-Brown | .... | B60L 11/005 |
| 9,590,516 B2 * | 3/2017 | Biebach | ............. | H02M 3/33584 |
| 9,654,021 B2 * | 5/2017 | Wei | ............. | H02M 5/4585 |
| 9,718,374 B2 * | 8/2017 | Tang | ............. | B60L 11/1842 |
| 9,819,221 B2 * | 11/2017 | Yang | ............. | H02J 9/062 |
| 9,845,021 B2 * | 12/2017 | Yang | ............. | B60L 3/00 |
| 9,937,805 B2 * | 4/2018 | Lee | ............. | B60L 11/1803 |
| 9,969,290 B2 * | 5/2018 | Tang | ............. | B60L 11/1842 |
| 10,059,210 B2 * | 8/2018 | Yang | ............. | B60L 1/003 |
| 10,166,882 B2 * | 1/2019 | Yang | ............. | B60L 11/187 |
| 2004/0080165 A1 * | 4/2004 | Geis | ............. | F01D 15/08 290/52 |
| 2004/0222761 A1 * | 11/2004 | Jockel | ............. | B60L 7/06 318/376 |
| 2005/0024001 A1 * | 2/2005 | Donnelly | ............. | B60L 3/102 318/66 |
| 2005/0045058 A1 * | 3/2005 | Donnelly | ............. | B60L 3/0046 105/26.05 |
| 2005/0235865 A1 * | 10/2005 | Kumar | ............. | B60L 9/16 105/61 |
| 2005/0264245 A1 * | 12/2005 | Donnelly | ............. | B60L 3/102 318/139 |
| 2006/0066112 A1 * | 3/2006 | Geis | ............. | F01D 15/08 290/52 |
| 2006/0071557 A1 * | 4/2006 | Osawa | ............. | B60L 3/0046 307/10.1 |
| 2006/0076171 A1 * | 4/2006 | Donnelly | ............. | B60L 7/04 180/65.225 |
| 2006/0092676 A1 * | 5/2006 | Liptak | ............. | H02M 3/337 363/56.02 |
| 2007/0108939 A1 * | 5/2007 | Miyagi | ............. | H01M 2/1077 320/112 |
| 2007/0170910 A1 * | 7/2007 | Chang | ............. | H01C 1/16 333/172 |
| 2008/0197706 A1 * | 8/2008 | Nielsen | ............. | H02J 1/102 307/66 |
| 2008/0290842 A1 * | 11/2008 | Davis | ............. | B60L 7/24 320/166 |
| 2009/0167260 A1 * | 7/2009 | Pauritsch | ............. | H02J 7/0065 323/233 |
| 2009/0201620 A1 * | 8/2009 | Gray | ............. | B60L 11/00 361/159 |
| 2009/0261658 A1 * | 10/2009 | Kato | ............. | B60K 6/365 307/82 |
| 2009/0302685 A1 * | 12/2009 | Kramer | ............. | B60L 11/005 307/80 |
| 2010/0019737 A1 * | 1/2010 | Leboeuf | ............. | H02J 7/345 320/167 |
| 2010/0109473 A1 * | 5/2010 | Peterson | ............. | H01G 7/04 310/306 |
| 2010/0188869 A1 * | 7/2010 | Fredette | ............. | H02M 1/10 363/15 |
| 2010/0213903 A1 * | 8/2010 | Ozimek | ............. | H01J 37/32091 320/166 |
| 2010/0231173 A1 * | 9/2010 | Andrea | ............. | H02J 7/022 320/137 |
| 2011/0089896 A1 * | 4/2011 | Grivaux | ............. | B60L 11/005 320/110 |

(56) References Cited

U.S. PATENT DOCUMENTS

| | | | |
|---|---|---|---|
| 2011/0166736 A1* | 7/2011 | Kitanaka | B60L 3/003 701/22 |
| 2011/0175441 A1* | 7/2011 | Langlois | H02M 3/156 307/9.1 |
| 2011/0210746 A1* | 9/2011 | Yugou | B60L 3/04 324/427 |
| 2011/0215743 A1* | 9/2011 | Fukatsu | B60L 11/1811 318/139 |
| 2012/0068537 A1* | 3/2012 | Hintz | B60L 11/005 307/43 |
| 2012/0176090 A1* | 7/2012 | Andrea | H02J 7/022 320/128 |
| 2012/0222910 A1* | 9/2012 | Miyagawa | B60L 11/14 180/291 |
| 2012/0223667 A1* | 9/2012 | Wang | H02M 3/1588 318/768 |
| 2012/0235661 A1* | 9/2012 | Roessler | H02H 3/087 323/284 |
| 2012/0303189 A1* | 11/2012 | Namuduri | B60W 20/00 701/22 |
| 2013/0002197 A1* | 1/2013 | Hernandez | B60L 11/1824 320/109 |
| 2013/0026831 A1* | 1/2013 | Sihler | H02J 3/32 307/19 |
| 2013/0038273 A1* | 2/2013 | Riggio | H02J 7/00 320/107 |
| 2013/0116875 A1* | 5/2013 | Oh | B60L 15/2045 701/22 |
| 2013/0194847 A1* | 8/2013 | Taddeo | H02M 1/10 363/123 |
| 2013/0249468 A1* | 9/2013 | Bajjuri | F02N 11/0825 320/104 |
| 2013/0264995 A1* | 10/2013 | Lee | B60L 11/1803 320/104 |
| 2013/0271077 A1* | 10/2013 | Kim | B60L 11/1811 320/109 |
| 2014/0015474 A1* | 1/2014 | Tsai | H02J 7/0042 320/103 |
| 2014/0139194 A1* | 5/2014 | Dinand Da Silva | H02J 7/0052 320/166 |
| 2014/0175868 A1* | 6/2014 | Sakakibara | H02M 7/537 307/9.1 |
| 2014/0346862 A1* | 11/2014 | Winkler | B60L 11/1814 307/9.1 |
| 2014/0355311 A1 | 12/2014 | Biebach et al. | |
| 2014/0368170 A1* | 12/2014 | Tang | B60L 11/1842 320/137 |
| 2015/0042277 A1* | 2/2015 | Tang | B60L 11/1842 320/109 |
| 2015/0098257 A1* | 4/2015 | Wei | H02M 5/4585 363/37 |
| 2015/0166045 A1* | 6/2015 | Chen | B60L 1/003 701/22 |
| 2015/0192973 A1* | 7/2015 | Hintz | B60L 11/005 307/80 |
| 2015/0251542 A1* | 9/2015 | Mensah-Brown | B60L 11/005 307/10.1 |
| 2015/0274023 A1* | 10/2015 | Houivet | B60L 3/04 320/108 |
| 2015/0274024 A1* | 10/2015 | Da Costa | B60L 11/1816 320/109 |
| 2015/0295421 A1* | 10/2015 | Blakemore | H02J 7/007 320/129 |
| 2015/0357863 A1* | 12/2015 | Sadakata | H02J 5/005 320/108 |
| 2016/0006295 A1* | 1/2016 | Yang | H02J 9/062 307/66 |
| 2016/0028271 A1* | 1/2016 | Smith | H02J 7/35 320/101 |
| 2016/0152151 A1* | 6/2016 | Yang | B60L 11/1812 320/109 |
| 2016/0152153 A1* | 6/2016 | Yang | B60L 1/003 320/109 |
| 2016/0159235 A1* | 6/2016 | Yang | B60L 3/00 320/109 |
| 2016/0181829 A1* | 6/2016 | Huang | H02J 7/0077 320/162 |
| 2016/0293368 A1* | 10/2016 | Tanaka | H01H 50/40 |
| 2016/0352252 A1* | 12/2016 | Yu | H02M 7/537 |
| 2016/0368390 A1* | 12/2016 | Yang | B60L 1/003 |
| 2017/0207634 A1* | 7/2017 | Katano | H02J 3/387 |

* cited by examiner

TROLLEY INTERFACING DEVICE HAVING A PRE-CHARGING UNIT

BACKGROUND

Embodiments of the present specification relate generally to a trolley interfacing device, and more particularly to a pre-charging unit employed in the trolley interfacing device.

Generally, a traction load, such as a railway car receives electrical power from trolley lines. The traction load includes pantographs that are used for coupling the traction load to the trolley lines for receiving the electrical power. Typically, a diesel generator is used as a voltage source to provide the electrical power to the traction load. However, in some scenarios, the traction load is driven by connecting the pantographs of the traction load to the trolley lines that are coupled to a direct current (DC) grid. The trolley lines are designed to convey/transfer a voltage that is higher than a design voltage, thereby entailing use of a buck converter to interface the trolley lines to the traction load. By way of example, the pantographs of the traction load that is electrically coupled to the trolley lines are used to provide the higher voltage from the trolley lines to the buck converter. Further, the buck converter converts this high voltage to a lower voltage before providing the voltage to the traction load. However, when the pantographs are coupled to the trolley lines, a large surge current flows from the DC grid to the buck converter via the trolley lines and the pantographs. This surge current results in voltage fluctuations in the DC grid and may damage the DC grid. Also, the surge current that flows to the buck converter may impose physical stress on the components in the buck converter and may damage the components in the buck converter.

In conventional systems, this surge current is prevented by precharging a capacitor in the buck converter through a resistor. Particularly, the resistor limits the current flowing from the DC grid to the capacitor, which in turn aids in slowing the charging of the capacitor, consequently preventing/minimizing the surge current at the capacitor. However, once the capacitor is charged, it is desirable to disconnect the resistor from the pantographs to avoid high electrical losses. In the conventional systems, to facilitate disconnecting the resistor from the pantographs, mechanical switches (MV switches) are positioned between the pantographs and the buck converter and across the resistor to aid in bypassing the resistor. However, these mechanical switches are heavy in weight, slow in switching, and also very expensive.

BRIEF DESCRIPTION

In accordance with aspects of the present specification, a trolley interfacing device for interfacing a traction load to a voltage source is presented. The trolley interfacing device includes a first charging unit coupled in parallel to the voltage source. Further, the trolley interfacing device includes a second charging unit coupled in parallel to the traction load, where the second charging unit includes at least one inductor. Also, the trolley interfacing device includes a pre-charging unit coupled in parallel to the second charging unit and configured to pre-charge the first charging unit with a voltage across the at least one inductor prior to electrically coupling the first charging unit to the voltage source. In addition, the trolley interfacing device includes a voltage converting unit disposed between the first charging unit and the second charging unit and configured to step down a voltage provided by the voltage source to the traction load.

In accordance with a further aspect of the present specification, a method for interfacing a traction load to a voltage source is presented. The method includes decoupling a first charging unit of a trolley interfacing device from the voltage source. Further, the method includes activating a pre-charging unit of the trolley interfacing device to energize at least one inductor in a second charging unit of the trolley interfacing device. Also, the method includes deactivating the pre-charging unit to provide a voltage across the at least one energized inductor to the first charging unit prior to electrically coupling the first charging unit to the voltage source, where the first charging unit is pre-charged with the provided voltage to prevent a surge current flow from the voltage source while the first charging unit is operatively coupled to the voltage source.

In accordance with another aspect of the present specification, a system for driving a traction load is presented. The system includes a voltage source configured to supply a direct current (DC) voltage to drive the traction load. Further, the system includes a trolley interfacing device disposed between the voltage source and the traction load and configured to step down the DC voltage supplied from the voltage source to the traction load, where the trolley interfacing device includes a first charging unit coupled in parallel to the voltage source, a second charging unit coupled in parallel to the traction load, where the second charging unit includes at least one inductor, a pre-charging unit coupled in parallel to the second charging unit and configured to pre-charge the first charging unit with a voltage across the at least one inductor prior to electrically coupling the first charging unit to the voltage source, and a voltage converting unit disposed between the first charging unit and the second charging unit and configured to step down a voltage provided by the voltage source to the traction load.

In accordance with yet another aspect of the present specification, a trolley interfacing kit for interfacing a traction load to a voltage source is presented. The trolley interfacing kit includes a pre-charging unit configured to pre-charge a first charging unit with a voltage across at least one inductor in a second charging unit prior to electrically coupling the first charging unit to the voltage source, where the pre-charging unit is coupled in parallel to a voltage converting unit and the second charging unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for driving a traction load are presented. In particular, a trolley interfacing device for interfacing a traction load to a voltage source is presented. The systems and methods circumvent the shortcomings of the conventional systems via use of an interfacing device. In particular, the systems and methods presented herein aid in pre-charging one or more capacitors in the interfacing device before coupling the interfacing device to the voltage source. This in turn prevents/minimizes the surge current at the capacitors and also prevents components in the interfacing device from being damaged. Also, these capacitors are pre-charged by employing electronic switches, which are light in weight, fast in switching, and also inexpensive to use in the interfacing device.

Figure 1:
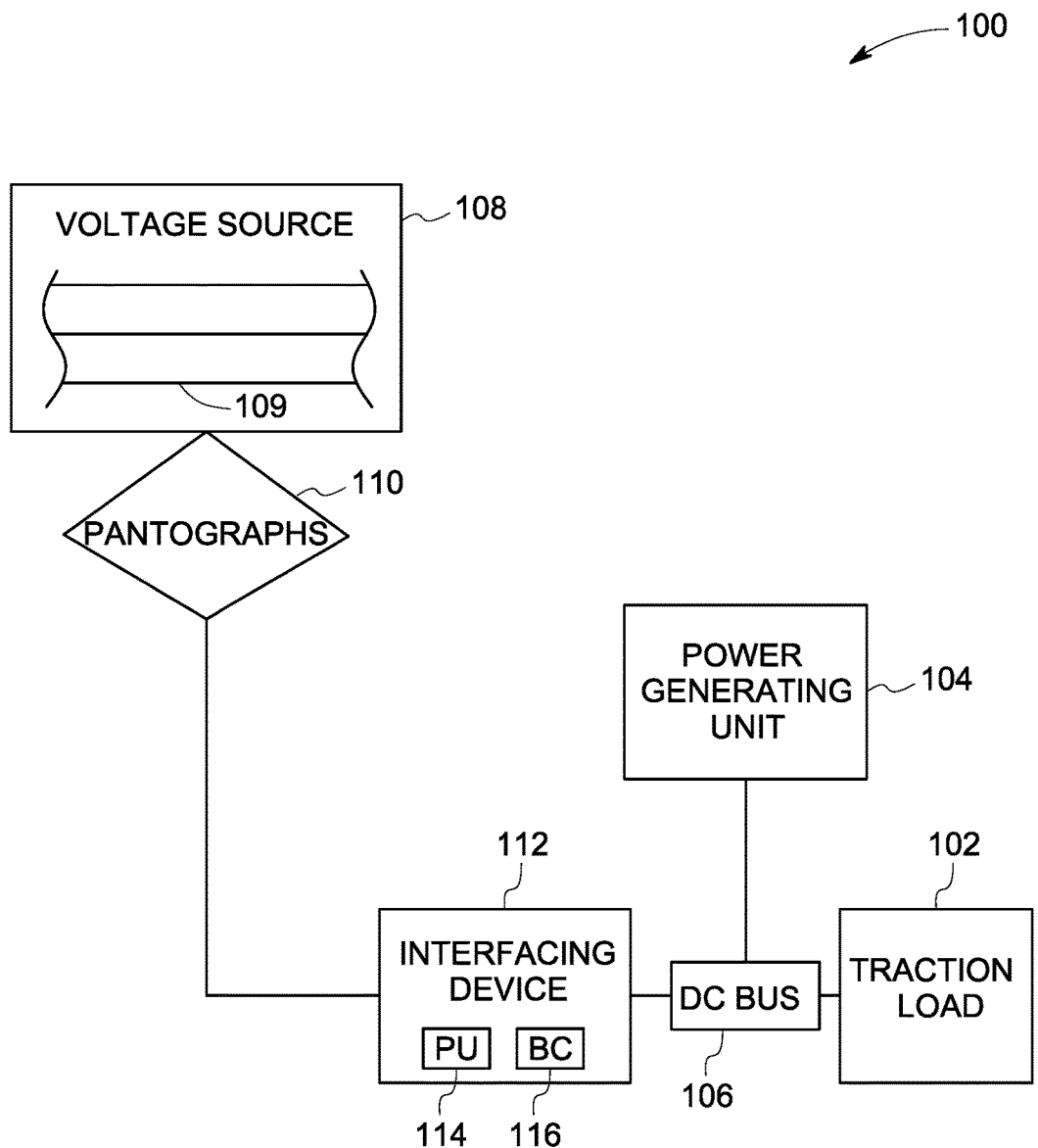
FIG. 1 is a diagrammatical representation of a system for driving a traction load, in accordance with aspects of the present specification.

Turning now to the drawings and referring to FIG. 1, a diagrammatical representation of a system 100 for driving a traction load, in accordance with aspects of the present specification, is depicted. In one example, the traction load may be a railway car 102. Furthermore, the railway car 102 may travel along a track line (not shown) based on electrical power provided to the railway car 102. Particularly, the railway car 102 may include one or more motors and an inverter (not shown) that are provided with the electrical power to drive the railway car 102 along the track line. In one example, the electrical power may be a direct current (DC) power. It may be noted that the railway car 102 may include other components, and is not limited to the motors and the inverter. Also, it may be noted that the terms "railway car" and "traction load" may be used interchangeably in the following description.

In a presently contemplated configuration, the system 100 includes a power generating unit 104, a DC bus 106, pantographs 110, an interfacing device 112, and a voltage source 108. The pantographs 110 are used to electrically couple the interfacing device 112 to the voltage source 108. Further, the DC bus 106 is used to electrically couple the power generating unit 104 and the interfacing device 112 to the traction load 110. Moreover, the voltage source 108 may be coupled to a DC grid (not shown). Also, the voltage source 108 may include trolley lines 109 coupled to the DC grid for receiving electrical power from the DC grid.

In one embodiment, the power generating unit 104 includes a diesel generator, an alternator, and a rectifier (not shown) that are coupled in series with each other. Further, the diesel generator may generate electrical power by converting mechanical energy into electrical energy. Thereafter, the generated electrical power is provided to the traction load 102 via the alternator and the rectifier. It may be noted that the power generating unit 104 may include other components, and is not limited to the components, such as the diesel generator, the alternator, and the rectifier.

In general, a current line of the traction load 102 is coupled to the power generating unit 104 and configured to receive the electrical power from the power generating unit 104. However, in some scenarios, the traction load 102 may be driven by another source such as the voltage source 108, where the voltage source 108 is coupled to the DC grid. By way of example, when the traction load 102 is climbing over a hill, the traction load 102 may require electrical power that is higher than the electrical power provided by the power generating unit 104. In this scenario, the pantographs 110 of the traction load 102 may be activated or turned ON to electrically couple the traction load 102 to the voltage source 108. Also, when the pantographs 110 are activated, the DC bus 106 may couple the current line of the traction load 102 to the voltage source 108. However, as the voltage source 108 is coupled to the DC grid, the voltage source 108 may provide a voltage that is higher than the design voltage of the traction load 102.

In accordance with aspects of the present specification, an interfacing device 112 configured to couple the traction load 102 to the voltage source 108 by bridging the difference in voltage levels between the voltage source 108 and the traction load 102 is presented. In particular, the interfacing device 112 is configured to interface the voltage source 108 to the traction load 102. In one embodiment, the interfacing device 112 includes a buck converter 116. Further, this buck converter 116 converts the higher voltage provided by the voltage source 108 to a lower voltage before providing the voltage to the traction load 102. Also, the interfacing device 112 may include one or more capacitors for smoothing the voltage received from the voltage source 108.

Moreover, when the interfacing device 112 is coupled to the voltage source 108, a large surge current flows from the voltage source 108 to the interfacing device 112. This surge current results in voltage fluctuations in the DC grid and may damage the DC grid. Also, the large surge current that flows to the interfacing device 112 may impose physical stress on the components in the interfacing device 112 and thereby result in damage to the components in the interfacing device 112.

To address the above shortcomings, the exemplary interfacing device 112 includes a pre-charging unit 114 that is used to prevent/minimize the surge current at the interfacing device 112. Particularly, the pre-charging unit 114 is used to pre-charge the one or more capacitors in the interfacing device 112 before the interfacing device 112 is coupled to the voltage source 108. This in turn aids in slowing the charging of the one or more capacitors, thereby preventing/minimizing the surge current at the capacitors. The aspect of pre-charging the capacitors and minimizing the surge current in the interfacing device 112 will be explained in greater detail with reference to FIGS. 2-5. In one embodiment, the pre-charging unit 114 may be a trolley interfacing kit that may be operatively coupled to an existing buck converter, thereby preventing or substantially reducing the flow of the surge current from the voltage source 108 to an existing buck converter.

Implementing the system 100 having the exemplary interfacing device 112 aids in enhancing the interface between the traction load 102 and the voltage source 108. Also, by employing the pre-charging unit 114 in the interfacing device 112, the surge current flow from the voltage source 108 to the interfacing device 112 may be prevented or substantially reduced. This in turn prevents damage of the components in the interfacing device 112.

Figure 2:
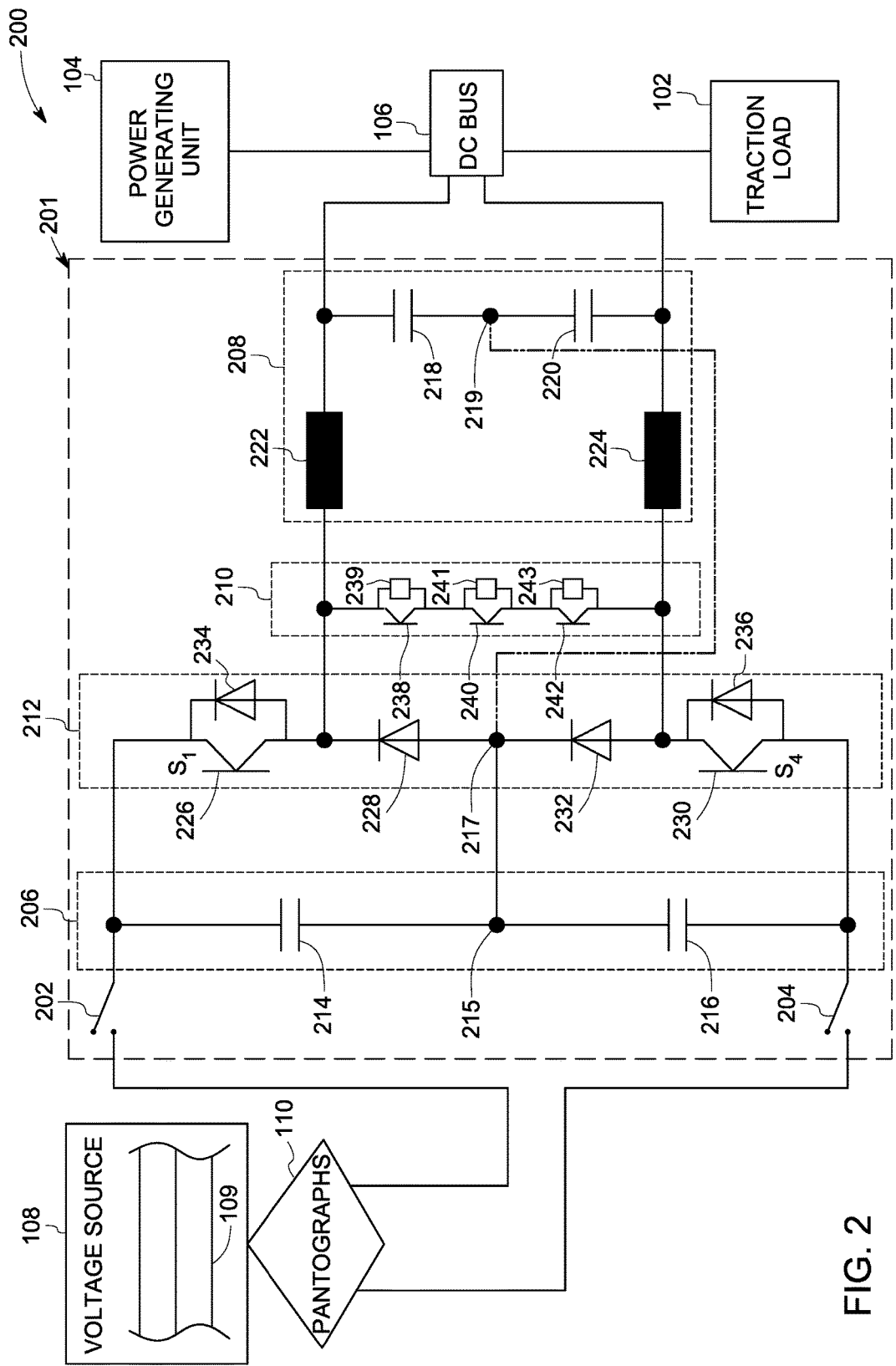
FIG. 2 is a schematic diagram of a trolley interfacing device for use in the system of FIG. 1, in accordance with aspects of the present specification.

Referring to FIG. 2, one example/embodiment 200 of a system for driving a traction load such as the system 100 of FIG. 1 is depicted. In particular, the system 200 includes an interfacing device 201 for interfacing a voltage source to a traction load, in accordance with aspects of the present specification. The interfacing device 201 may be representative of one embodiment of the interfacing device 112 of FIG. 1. For ease of understanding, the interfacing device 201 of FIG. 2 is described with reference to the components of FIG. 1. It may be noted that the interfacing device 201 may also be referred to as a trolley interfacing device that is used to electrically couple a traction load to a voltage source.

In general, the DC grid/voltage source 108 is a bipolar structure. Accordingly, the interfacing device 201 having the symmetrical structure is selected. More particularly, in a presently contemplated configuration, the interfacing device 201 is a symmetrical structure having a central point or midpoint ground. Further, the interfacing device 201 includes input terminals and output terminals. The input terminals of the interfacing device 201 are coupled to the voltage source 108 via the pantographs 110. In a similar fashion, the output terminals of the interfacing device 201 are coupled to the traction load 102 via the DC bus 106. In one example, one of the input terminals of the interfacing device 201 is coupled to a trolley line having a voltage of +1200V, while the other of the input terminals of the interfacing device 201 is coupled to another trolley line having a voltage of −1200V.

Further, in a presently contemplated configuration, the interfacing device 201 includes a pair of switches 202, 204, a first charging unit 206, a second charging unit 208, a pre-charging unit 210, and a voltage converting unit 212. It may be noted that a combination of the first charging unit 206, the voltage converting unit 212, and the second charging unit 208 may be used as a buck converter to step down the voltage supplied from the voltage source 108 before conveying the voltage to the traction load 102. In one example, the buck converter may step down the voltage of 2400V supplied from the voltage source 108 to a voltage of 1500V by adjusting a duty cycle of the electronic switches 226 and 230. The duty cycle may be representative of a cycle/time period during which the electronic switches 226 and 230 are turned ON and OFF. The aspect of stepping down the voltage will be described in greater detail with reference to FIG. 5. It may be noted that the terms "turned ON" and "activated" may be used interchangeably. Also, it may be noted that the terms "turned OFF" and "deactivated" may be used interchangeably.

In exemplary embodiment depicted in FIG. 2, the pair of switches 202, 204 is configured to electrically couple or decouple the interfacing device 201 from the voltage source 108. In one example, the switches 202, 204 are activated or turned ON to electrically couple the interfacing device 201 to the voltage source 108 via the pantographs 110. In a similar manner, the switches 202, 204 are deactivated or turned OFF to electrically decouple the interfacing device 201 from the voltage source 108. In one embodiment, the switches 202, 204 may be included in the pantographs 110 and may be activated or deactivated based on activation or deactivation of the pantographs 110.

Further, the first charging unit 206 is configured to remove AC ripples in the voltage received from the voltage source 108. In a presently contemplated configuration, the first charging unit 206 is coupled in parallel to the voltage source 108. Particularly, the first charging unit 206 includes a first capacitor 214 and a second capacitor 216 that are coupled in series with each other and in parallel to the voltage source 108. Also, the first capacitor 214 is coupled in series with the switch 202, while the second capacitor 216 is coupled in series with the switch 204. Also, in one embodiment, the first charging unit 206 includes a first midpoint 215 between the first capacitor 214 and the second capacitor 216, where the first midpoint 215 is coupled to a second midpoint 217 of the voltage converting unit 212, as depicted in FIG. 2.

In a similar manner, the second charging unit 208 is configured to provide a load voltage or a converted voltage to the traction load 102. In one example, the load voltage may be a stepped down voltage of the voltage provided by the voltage source 108. The second charging unit 208 is coupled in parallel to the traction load 102 and the power generating unit 104 via the DC bus 106. In particular, the second charging unit 208 includes a third capacitor 218 and a fourth capacitor 220 that are coupled in series with each other. Further, the third capacitor 218 and the fourth capacitor 220 are coupled in parallel to the traction load 102 and the power generating unit 104 via the DC bus 106. In one example, the DC bus 106 may electrically couple the third capacitor 218 and the fourth capacitor 220 to the power generating unit 104 for pre-charging the third capacitor 218 and the fourth capacitor 220 with a voltage provided by the power generating unit 104.

In another example, the DC bus 106 may electrically couple the third capacitor 218 and the fourth capacitor 220 to the traction load 102 for conveying the voltage received from the voltage source 108 to the traction load 102. In one embodiment, the second charging unit 208 may include a third midpoint 219 between the third capacitor 218 and the fourth capacitor 220, where the third midpoint may be optionally coupled to the second midpoint 217 of the voltage converting unit 212. Also, in one another embodiment, the second charging unit 208 may include only a single capacitor in the place of the third and fourth capacitors 218, 220. In this example, this single capacitor may have a value which is a reciprocal of a sum of reciprocal capacitance values of the third and fourth capacitors 218, 220. In addition to the third and fourth capacitors 218, 220, the second charging unit 208 includes a first inductor 222 and a second inductor 224 that are coupled in series with the third capacitor 218 and the fourth capacitor 220, respectively.

Furthermore, the voltage converting unit 212 is configured to convert the voltage received from the voltage source 108. In one example, the voltage converting unit 212 is used to step down the voltage received from the voltage source 108. In one embodiment, the voltage converting unit 212 is coupled in parallel to the first charging unit 206. The voltage converting unit 212 includes a first electronic switch 226 and a first diode 228 that are coupled in series with each other and in parallel to the first capacitor 214. Similarly, the voltage converting unit 212 includes a second electronic switch 230 and a second diode 232 that are coupled in series with each other and in parallel to the second capacitor 216. Also, the first electronic switch 226 and the second electronic switch 230 are toggled between an ON state and an OFF state based on a determined triggering pulse signal to reduce or step down the voltage received from the voltage source 108. In addition, the voltage converting unit 212 includes a third diode 234 that is coupled in parallel to the first electronic switch 226, and a fourth diode 236 that is coupled in parallel to the second electronic switch 230, as depicted in FIG. 2. It may be noted that the voltage converting unit 212 may include any type of voltage converting circuit, and is not limited to the circuit shown in FIG. 2.

Moreover, the interfacing device 201 includes the exemplary pre-charging unit 210. In the embodiment of FIG. 2, the pre-charging unit 210 is coupled in parallel to the second charging unit 208. Also, the pre-charging unit 210 is used to pre-charge the first charging unit 206 to a voltage value equal to a first threshold value. In one example, the first threshold value may be equal to or slightly higher than the voltage across the voltage source 108. In another example, the first threshold value may be 10% higher than the voltage across the voltage source 108. The pre-charging unit 210 includes a plurality of electronic switches 238, 240, 242 that are coupled in series with each other and in parallel to the second charging unit 208. Unlike mechanical switches, these electronic switches 238, 240, 242 are light in weight, fast in switching, and also inexpensive to use. In one example, each of the electronic switches 238, 240, 242 includes an Insulated Gate Bipolar Transistor (IGBT) or a Bipolar Junction Transistors (BJT). It may be noted that the electronic switches 238, 240, 242 may be any type of switches, and are not limited to IGBTs or BJTs. Also, it may be noted that the pre-charging unit 210 may include any number of electronic switches, and is not limited to three switches, as depicted in FIG. 2.

Further, the pre-charging unit 210 includes voltage distribution units 239, 241, 243 that are coupled in parallel to each of the electronic switches 238, 240, 242. The voltage distribution units 239, 241, 243 are used to ensure that voltage across each of the electronic switches 238, 240, 242 is equally distributed when the electronic switches 238, 240, 242 are in a transient state or in a steady state. The transient state may be representative of a state where the electronic switches 238, 240, 242 are repeatedly turned ON and OFF. Also, the steady state may be representative of a state where the electronic switches 238, 240, 242 are permanently turned OFF. In one example, the voltage distribution units 239, 241, 243 may include diodes and voltage balancing circuits that are used to dissipate heat or power when the electronic switches 238, 240, 242 are deactivated or turned OFF and to ensure that the voltage is equally distributed across each of the electronic switches 238, 240, 242.

During operation of the system 200, the switches 202, 204 are first deactivated to decouple the interfacing device 201 from the voltage source 108. Particularly, the interfacing device 201 is decoupled from the voltage source 108 until the first and second capacitors 214, 216 are pre-charged to a voltage value equal to or slightly higher than the voltage across the voltage source 108. Further, the electronic switches 238, 240, 242 are activated or turned ON to form a closed current loop between the second charging unit 208 and the pre-charging unit 210. This closed current loop may aid in energizing or charging the first inductor 222 and the second inductor 224 of the second charging unit 208. Also, the current across the first inductor 222 and the second inductor 224 may ramp-up when the electronic switches 238, 240, 242 are activated.

Subsequent to charging the first inductor 222 and the second inductor 224, the electronic switches 238, 240, 242 are deactivated or turned OFF to break the closed current loop. As the electronic switches 238, 240, 242 are deactivated, the current in the first inductor 222 and the second inductor 224 may start flowing towards the first charging unit 206 via the diodes 234 and 236 in the voltage converting unit 212. As a result, the current may ramp-down in the first inductor 222 and the second inductor 224.

Also, the current that is flowing in the first charging unit 206 may be used to pre-charge the first capacitor 214 and the second capacitor 216 in the first charging unit 206. In one embodiment, the electronic switches 238, 240, 242 may be repeatedly turned ON and OFF at a determined duty cycle to control an average value of the current provided to pre-charge the first capacitor 214 and the second capacitor 216 in the first charging unit 206. Further, by pre-charging the first capacitor 214 and the second capacitor 216, the voltage across the first capacitor 214 and the second capacitor 216 may be increased to the first threshold value. In one example, the first capacitor 214 and the second capacitor 216 may be charged to the first threshold value at a speed that is determined based on the determined duty cycle. Moreover, as previously noted, in one example, the first threshold value may be equal to or slightly higher than the voltage across the voltage source 108. In another example, the first threshold value may be 10% higher than the voltage across the voltage source 108.

Further, the switches 202, 204 are activated to couple the interfacing device 201 to the voltage source 108. Pre-charging the first capacitor 214 and the second capacitor 216 prior to coupling the interfacing device 201 to the voltage source 208 aids in preventing or substantially reducing the flow of the surge current from the voltage source 108 to the interfacing device 201. This in turn prevents components in the interfacing device 201 from being damaged. In one embodiment, the pre-charging unit 210 may be a trolley interfacing kit. In this example, the trolley interfacing kit may be operatively coupled to an existing buck converter, thereby preventing or substantially reducing the flow of the surge current from the voltage source 108 to the existing buck converter.

Figure 3:
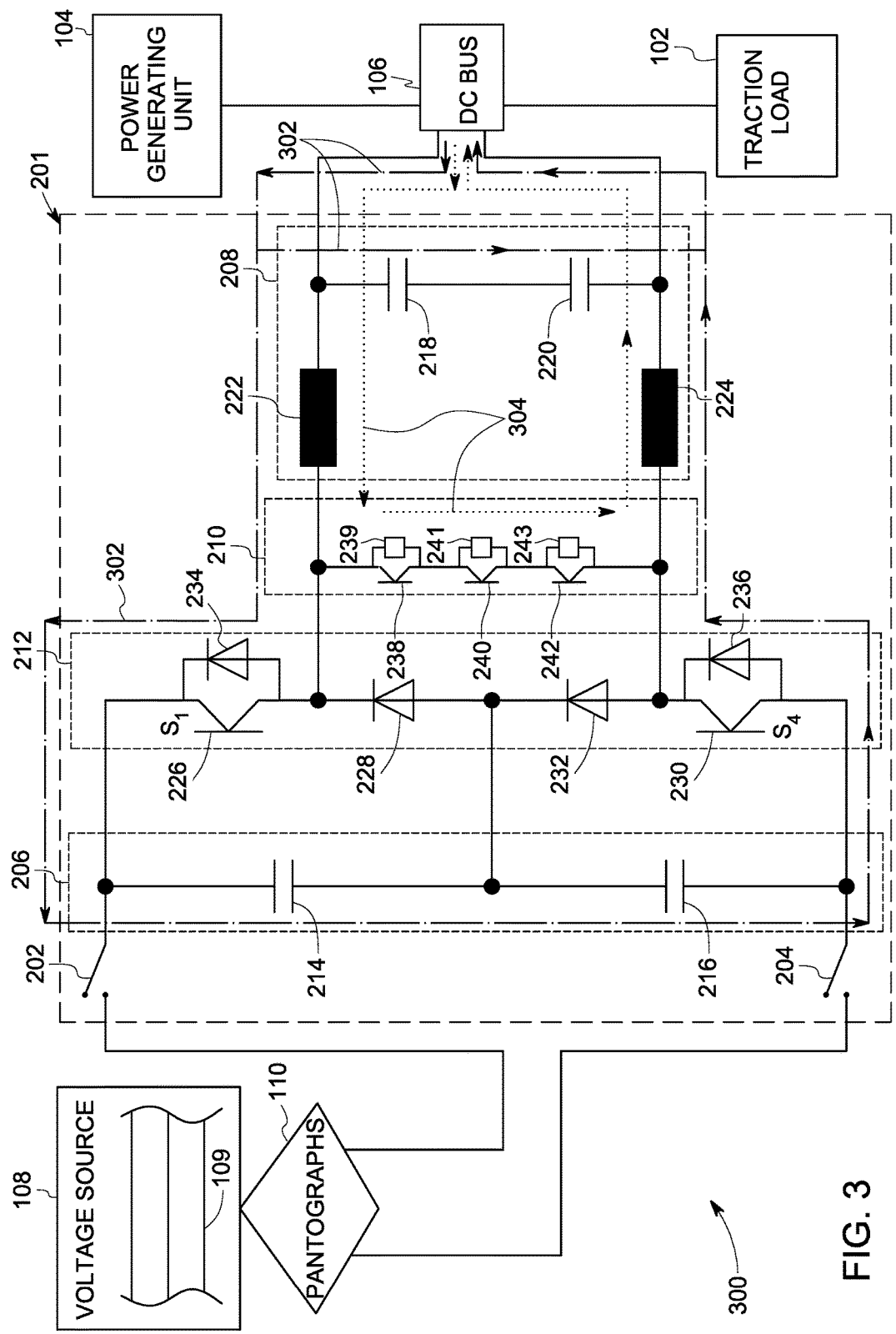
FIGS. 3-5 are schematic diagrams of the trolley interfacing device showing current flow directions at various operational stages of the trolley interfacing device, in accordance with aspects of the present specification.
Figure 4:
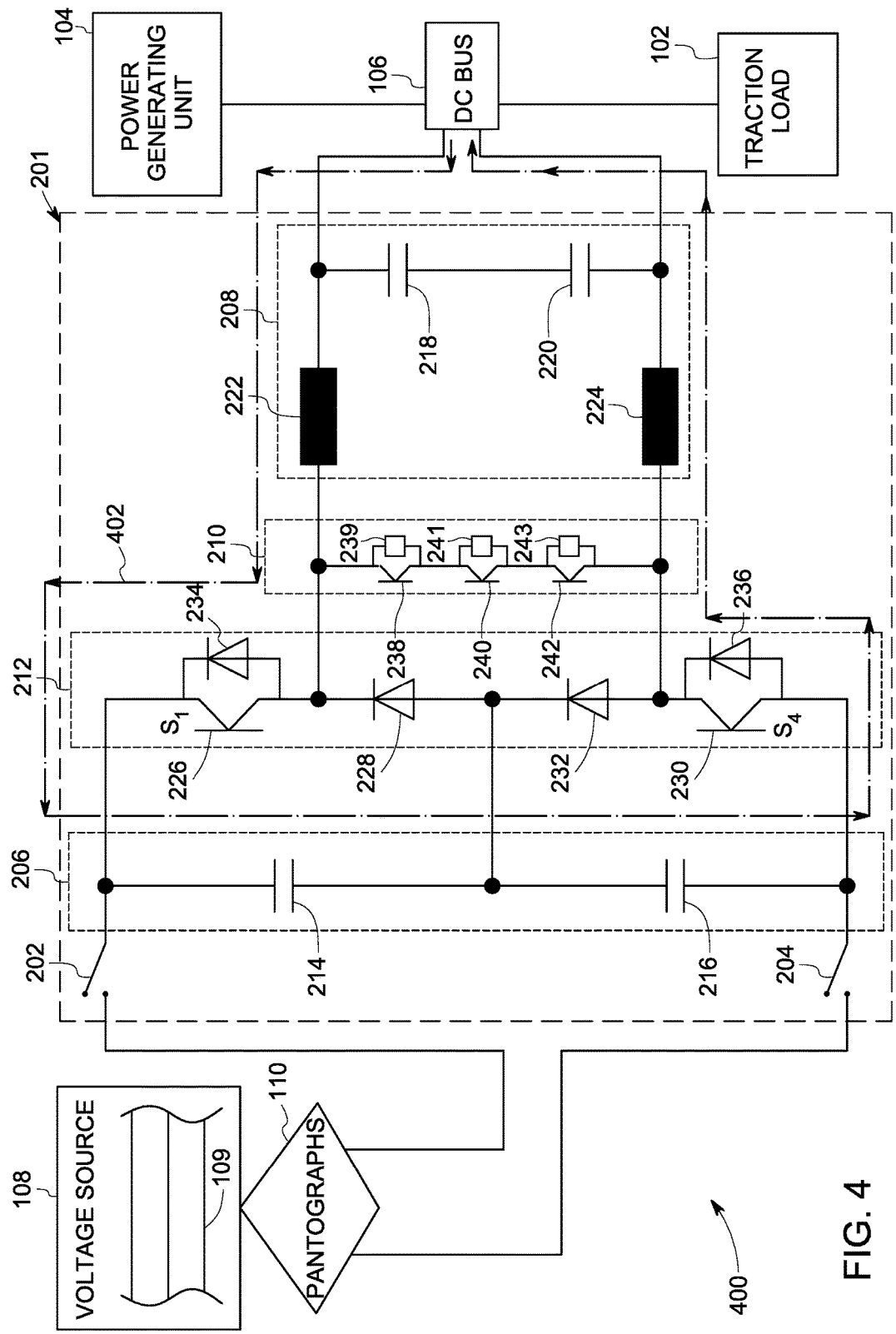
Figure 5:
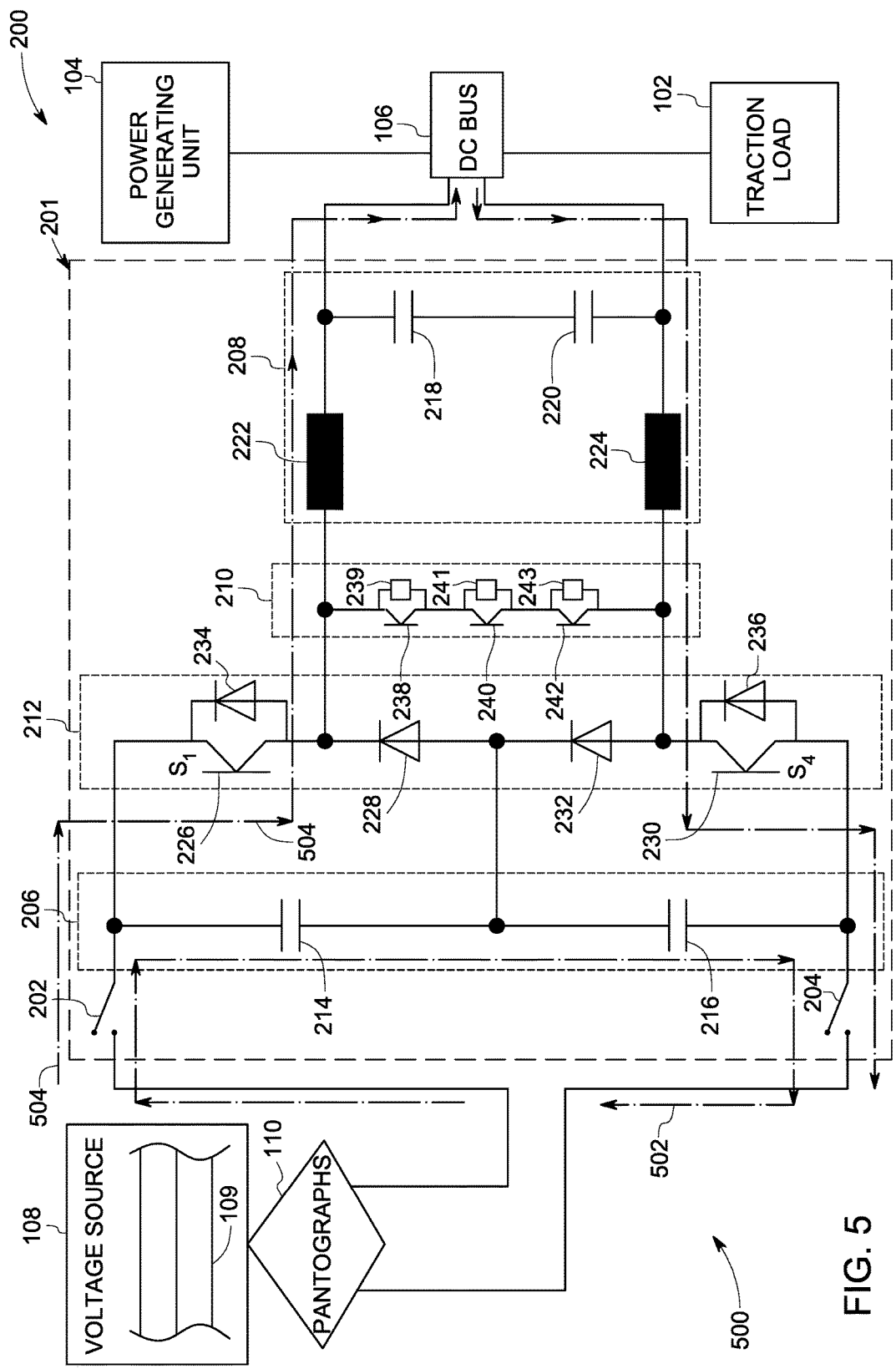

The functioning of the interfacing device 201 will be described with respect to FIGS. 3-5. More specifically, the aspect of energizing the inductors 222, 224 in the second charging unit 208 and pre-charging the capacitors 214, 216 in the first charging unit 206 will be described in greater detail with reference to FIGS. 3-5. Also, for ease of understanding, the interfacing device 201 is shown as operating in different operational stages, such as a first stage, a second stage, and a third stage. Particularly, FIG. 3 depicts the first stage of operation of the interfacing device 201, during which the inductors 222, 224 in the second charging unit 208 are energized or charged. FIG. 4 depicts the second stage of operation of the interfacing device 201, during which the capacitors 214, 216 in the first charging unit 206 are pre-charged. Also, FIG. 5 depicts the third stage of operation of the interfacing device 201, during which the interfacing device 201 is coupled to the voltage source 108.

Referring to FIG. 3, one example/embodiment 300 of the system 200 for driving a traction load of FIG. 2 during the first stage of operation is depicted. It may be noted that FIG. 3 is described with reference to the components of FIGS. 1-2.

As previously noted, the system 300 includes the interfacing device 201 for interfacing the voltage source 108 to the traction load 102. In the first stage of operation of the interfacing device 201, the pre-charging unit 210 is activated and the switches 202, 204 are deactivated. More specifically, during operation of the system 300, the traction load 102 is initially coupled to the power generating unit 104 and the traction load 102 is driven along track lines based on electrical power provided by the power generating unit 104. Further, when the traction load 102 is coupled to the power generating unit 104, the switches 202, 204 are deactivated to decouple the interfacing device 201 and the traction load 102 from the voltage source 108.

Moreover, when the interfacing device 201 is decoupled from the voltage source 108, the second charging unit 208 may be charged with the voltage at the power generating unit 104. Particularly, the third capacitor 218 and the fourth capacitor 220 in the second charging unit 208 may be electrically coupled to the power generating unit 104 via the DC bus 106 to receive electrical energy from the power generating unit 104. In one embodiment, the DC bus 106 may have a voltage of about 1500 V, which is concurrently supplied to the traction load 102 and the interfacing device 201. More specifically, the DC bus 106 may act as a DC voltage source to the interfacing device 201 while the switches 202 and 204 are turned OFF. As a result, an electric current may flow from the DC bus 106 to the interfacing device 201 to charge the first capacitor 214, the second capacitor 216, the third capacitor 218, and the fourth capacitor 220. The direction of the flow of the electric current from the DC bus 106 to charge these capacitors 214, 216, 218, 220 is represented by a reference numeral 302 in FIG. 3. In one example, a sum of the voltages across the first and second capacitors 214, 216 is about 1500 V. Similarly, a sum of the voltages across the third and fourth capacitors 218, 220 is about 1500 V.

Further, the pre-charging unit 210 may be activated to form a closed current loop between the pre-charging unit 210 and the second charging unit 208. Particularly, the plurality of electronic switches 238, 240, 242 in the pre-charging unit 210 is activated to short-circuit or connect terminals of the first inductor 222 and the second inductor 224 in the second charging unit 208. This in turn aids in energizing or charging the first inductor 222 and the second inductor 224. More specifically, when the electronic switches 238, 240, 242 in the pre-charging unit 210 are activated, the electric current may flow from the DC bus 106 through the first inductor 222, the electronic switches 238, 240, 242, the second inductor 224, and then back to the DC bus 106. The direction of the flow of the electric current from the DC bus 106 through the pre-charging unit 210 is represented by a reference numeral 304 in FIG. 3. Further, this closed current loop may aid in energizing or charging the first inductor 222 and the second inductor 224 of the second charging unit 208. Also, the current may ramp-up in the first inductor 222 and the second inductor 224.

Moreover, after energizing or charging the first inductor 222 and the second inductor 224, the electronic switches 238, 240, 242 in the pre-charging unit 210 are deactivated to deactivate the pre-charging unit 210. By deactivating the pre-charging unit 210, the energized or charged inductors 222, 224 may supply a current from the second charging unit 208 to the first charging unit 206 to pre-charge the capacitors 214, 216 in the first charging unit 206. The aspect of providing the current from the inductors 222, 224 to the first charging unit 206 will be described in greater detail with reference to FIG. 4.

Turning now to FIG. 4, one example/embodiment 400 of the system 200 for driving a traction load of FIG. 2 during the second stage of operation is depicted. It may be noted that FIG. 4 is described with reference to the components of FIGS. 1-3.

As previously noted, the system 400 includes the interfacing device 201 for interfacing the voltage source 108 to the traction load 102. In the second stage of operation of the interfacing device 201, the pre-charging unit 210 and the switches 202, 204 are deactivated. More specifically, subsequent to charging the first inductor 222 and the second inductor 224, the electronic switches 238, 240, 242 are deactivated to break the closed current loop. As the electronic switches 238, 240, 242 are deactivated, the current in the first inductor 222 and the second inductor 224 may start flowing towards the first charging unit 206 via the diodes 234 and 236 in the voltage converting unit 212. As a result, the current may ramp-down in the first inductor 222 and the second inductor 224. Also, the current that is flowing in the first charging unit 206 may be used to pre-charge the first capacitor 214 and the second capacitor 216 in the first charging unit 206. The direction of the flow of the electric current from the energized inductors 222, 224 towards the first charging unit 202 is represented by a reference numeral 402 in FIG. 4.

Further, this current flow in the interfacing device 201 may charge the first capacitor 214 and the second capacitor 216 in the first charging unit 206 to the first threshold value. More specifically, both the capacitors 214, 216 may be charged such that a sum of the charged voltages across the capacitors 214, 216 is equal to the first threshold value. In one example, the electronic switches 238, 240, 242 may be repeatedly turned ON and OFF at a determined duty cycle to charge the capacitors 214, 216 to the first threshold value. As previously noted, in one embodiment, the first threshold value may be equal to or slightly higher than the voltage across the voltage source 108. As the first capacitor 214 and the second capacitor 216 in the first charging unit 206 are charged to the first threshold value, the first charging unit 206 prevents the flow of surge current from the voltage source 108 to the interfacing device 201 when the current line is switched from the power generating unit 104 to the voltage source 108. This in turn prevents damage to the components in the interfacing device 201. The aspect of avoiding the surge current flow in the interfacing device 201 will be described in greater detail with reference to FIG. 5.

Referring now to FIG. 5, one example/embodiment 500 of the system 200 for driving a traction load of FIG. 2 during the third stage of operation is depicted. It may be noted that FIG. 5 is described with reference to the components of FIGS. 1-4.

As previously noted, the system 500 includes the interfacing device 201 for interfacing the voltage source 108 to the traction load 102. In the third stage of operation of the interfacing device 201, the pre-charging unit 210 is deactivated and the switches 202, 204 are activated. Also, the first switch 226 and the second switch 230 in the voltage converting unit 212 are activated. More specifically, when the traction load 102 is climbing over hills, it is desirable that the traction load 102 receives electrical power from the voltage source 108. In particular, when the traction load 102 is climbing over a hill, the traction load 102 may require power that is higher than the power provided by the power generating unit 104. In this scenario, the switches 202, 204 are activated and the DC bus 106 couples the current line of the traction load 102 to the voltage source 108 via the interfacing device 201. Once the switches 202, 204 are activated, the pantographs 110 electrically couple the voltage source 108 to the interfacing device 201, which in turn is coupled to the traction load 102 via the DC bus 106.

Furthermore, a current starts flowing from the voltage source 108 to the traction load 102 via the voltage converting unit 212. In one example, the voltage converting unit 212 may control the voltage provided by the voltage source 108 to the traction load 102 based on a duty cycle of the voltage converting unit 212. The direction of the current flow from the voltage source 108 to the traction load 102 is depicted by reference numeral 504 in FIG. 5. Further, as the first capacitor 214 and the second capacitor 216 are pre-charged to the first threshold value, surge of the current through the first capacitor 214 and the second capacitor 216 may be controlled. In one example, the surge current at the first and second capacitors 214, 216 may be prevented or minimized. The direction of the current flow from the voltage source 108 through the first and second capacitors 214, 216 is depicted by reference numeral 502 in FIG. 5.

In addition, the first switch 226 and the second switch 230 in the voltage converting unit 212 may perform a conventional function of a buck converter. In particular, the first and second switches 226, 230 aid in reducing the higher voltage received from the voltage source 108 to a lower voltage before providing the voltage to the traction load 102 via the second charging unit 208. More specifically, the first switch 226 and the second switch 230 are activated and/or deactivated based on a determined triggering pulse signal provided to the first switch 226 and the second switch 230. This in turn aids in reducing the voltage provided by the voltage source 108 before providing the voltage to the traction load 102. Furthermore, reference numeral 504 is also used to represent the direction of the electric current flowing through the first switch 226 and the second switch 230. Also, after driving the traction load 102 with the electrical power from the voltage source 108, the current line may be switched back to the power generating unit 104 and the electrical power from the power generating unit 104 may be provided to the traction load 102 via the DC bus 106.

Thus, by employing the exemplary pre-charging unit 210, the capacitors 214, 216 in the first charging unit 206 are pre-charged to the first threshold value to prevent a large surge current/rush current flowing from the voltage source 108. As a result, voltage fluctuations in the DC grid coupled to the voltage source 108 are substantially reduced. Also, the physical stress imposed by the surge current on the components of the pre-charging unit 210 may be substantially minimized.

Figure 6:
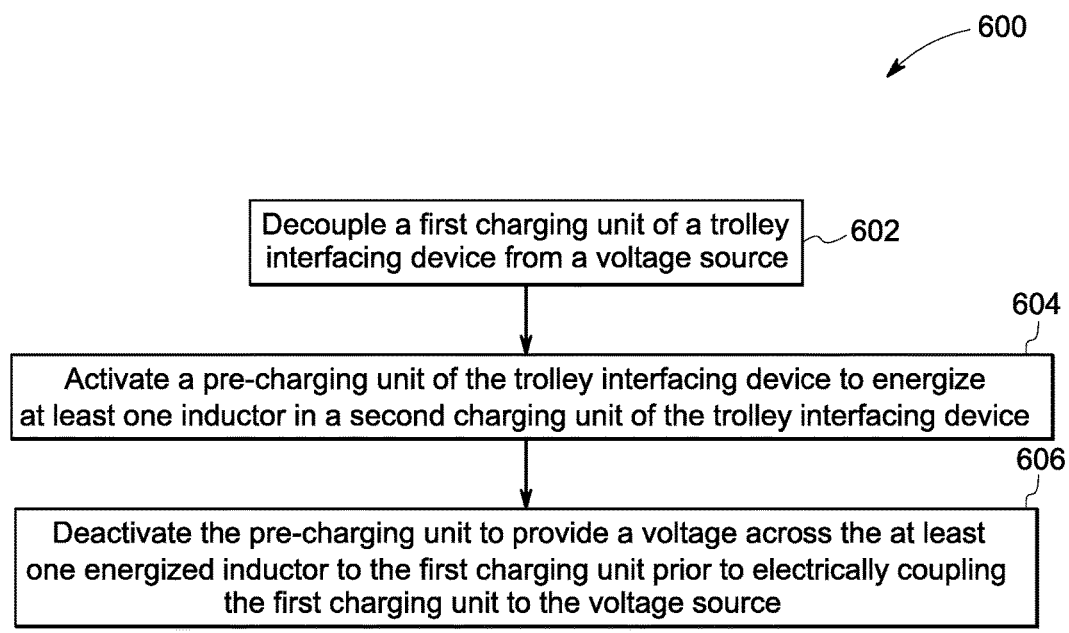
FIG. 6 is a flow chart illustrating a method for interfacing the traction load to a voltage source, in accordance with aspects of the present specification.

FIG. 6 is a flow chart illustrating a method 600 for interfacing a traction load to a voltage source/trolley lines, in accordance with aspects of the present specification. For ease of explanation, the method 600 is described with reference to the components of FIGS. 1-5. In general, a current line of the traction load 102 is coupled to the power generating unit 104 to receive electrical power from the power generating unit 104 and to drive the traction load 102 along a track line. Further, when the traction load 102 is climbing over a hill, the pantographs 110 of the traction load 102 may be activated or turned ON to electrically couple the traction load 102 to the voltage source 108 to receive electrical power from the voltage source 108. However, the voltage source 108 may provide a voltage that is higher than a design voltage of the traction load 102, thereby resulting in a large surge current from the voltage source 108. The method 600 aids in enhancing the interface between the traction load 102 and the voltage source 108 by controlling this higher voltage and the large surge current from the voltage source 108.

The method 600 begins at step 602, where the first charging unit 206 is decoupled from the voltage source 108. Particularly, the switches 202, 204 are deactivated to decouple the interfacing device 201 from the voltage source 108. Decoupling the interfacing device 201 from the voltage source 108 aids is preventing the first capacitor 214 and the second capacitor 216 from receiving a large surge current from the voltage source 108. More specifically, the interfacing device 201 is decoupled from the voltage source 108 until the first and second capacitors 214, 216 are pre-charged to a first threshold value.

Subsequently, at step 604, the pre-charging unit 210 may be activated to energize or charge at least one inductor 222, 224 in the second charging unit 208 of the trolley interfacing device 201. Particularly, the electronic switches 238, 240, 242 in the pre-charging unit 210 may be activated to form a closed current loop between the pre-charging unit 210 and the second charging unit 208. Also, electric current may flow through the at least one inductor 222, 224 in this closed current loop to energize or charge the at least one inductor 222, 224. Particularly, the electric current may ramp-up in the at least one inductor 222, 224 when the electronic switches 238, 240, 242 in the pre-charging unit 210 are activated.

Furthermore, at step 606, the pre-charging unit 210 is deactivated to provide a voltage across the at least one energized inductor 222, 224 to the first charging unit 206 prior to electrically coupling the first charging unit 206 to the voltage source 108. To that end, the electronic switches 238, 240, 242 in the pre-charging unit 210 may be deactivated to break the current loop between the pre-charging unit 210 and the second charging unit 208. As a result, the current may flow from the at least one inductor 222, 224 in the second charging unit 208 to the first charging unit 206 via the voltage converting unit 212 in a direction 402 depicted in FIG. 4. Also, this current flow may charge the first capacitor 214 and the second capacitor 216 in the first charging unit 206. Moreover, the first capacitor 214 and the second capacitor 216 may be charged to a voltage value equal to the first threshold value.

In one example, steps 604 and 602 may be repeated in a sequence at a determined duty cycle of the pre-charging unit 210 to charge the first capacitor 214 and the second capacitor 216 to the voltage value equal to the first threshold value. In one example, the sum of charged voltages across the first capacitor 214 and the second capacitor 216 is equal to the first threshold value. Also, as previously noted, in one example, the first threshold value may be equal to or slightly higher than the voltage across the voltage source 108. In another example, the first threshold value may be 10% higher than the voltage across the voltage source 108.

Thereafter, the switches 202, 204 are activated to electrically couple the interfacing device 201 to the voltage source 108 via the pantographs 110. As the first capacitor 214 and the second capacitor 216 are pre-charged to a voltage value equal to the first threshold value, the surge current flowing from the voltage source 108 through the first capacitor 214 and the second capacitor 216 may be substantially minimized. Also, the physical stress imposed by this surge current on the components of the interfacing device 201 may be substantially minimized. This in turn improves the life of the components in the interfacing device 201.

The various embodiments of the exemplary system and method aid in enhancing the interface between a traction load and a voltage source. In particular, the exemplary system and method aid in pre-charging one or more capacitors in an interfacing device prior to coupling the interfacing device to the voltage source. This in turn prevents/minimizes the surge current at the one or more capacitors and also minimizes damage to the components in the interfacing device. Also, these capacitors are pre-charged by employing electronic switches, which are light in weight, fast in switching, and also inexpensive to use in the interfacing device. In one embodiment, the pre-charging unit may be a trolley interfacing kit that may be operatively coupled to an existing buck converter, thereby preventing or substantially reducing the flow of the surge current from the voltage source to the buck converter.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A trolley interfacing device for interfacing a traction load to a voltage source, the trolley interfacing device comprising:
   a first charging unit including one or more capacitors, the first charging unit configured to be coupled in parallel to the voltage source through one or more first switches;
   a second charging unit comprising at least one inductor that is configured to be coupled in parallel to the traction load;
   a pre-charging unit including several second switches connected in a series with each other, the series of the second switches configured to be coupled in parallel to the second charging unit; and a voltage converting unit configured to be disposed between the first charging unit and the second charging unit, the voltage converting unit configured to step down a voltage provided by the voltage source to the traction load responsive to activation of the one or more first switches to couple the voltage source to the first charging unit through the one or more first switches, wherein the pre-charging unit is configured to reduce a surge current from being conducted from the voltage source to the one or more capacitors of the first charging unit responsive to activation of the one or more first switches, the pre-charging unit configured to reduce the surge current by pre-charging the one or more capacitors in the first charging unit prior to the activation of the one or more first switches.

2. The trolley interfacing device of claim 1, wherein the second charging unit is coupled to the traction load via a direct current (DC) bus, and wherein the DC bus is configured to electrically couple the trolley interfacing device and a power generating unit to the traction load.

3. The trolley interfacing device of claim 2, wherein the second charging unit comprises:
at least one capacitor coupled in parallel to the DC bus; and
the at least one inductor coupled in series to the DC bus.

4. The trolley interfacing device of claim 3, wherein the at least one capacitor is charged with a voltage across the DC bus.

5. The trolley interfacing device of claim 1, wherein the pre-charging unit comprises:
a plurality of voltage distribution units, wherein each of the plurality of voltage distribution units is coupled in parallel to a corresponding second switch of the second switches.

6. The trolley interfacing device of claim 5, wherein the second switches are activated to energize the at least one inductor in the second charging unit.

7. The trolley interfacing device of claim 5, wherein the first charging unit comprises a first capacitor, a second capacitor, and wherein a first midpoint between the first capacitor and the second capacitor is coupled to a second midpoint of the voltage converting unit.

8. The trolley interfacing device of claim 7, wherein the second switches in the pre-charging unit are deactivated to provide the voltage across the at least one energized inductor to pre-charge the first capacitor and the second capacitor in the first charging unit.

9. The trolley interfacing device of claim 8, wherein the first capacitor and the second capacitor in the first charging unit are pre-charged to a first threshold value.

10. A trolley interfacing kit for interfacing a traction load to a voltage source, comprising:
a pre-charging unit configured to pre-charge a first charging unit with a voltage across at least one inductor in a second charging unit,
wherein the first charging unit includes one or more first switches deactivated to decouple the voltage source from the first charging unit,
wherein the pre-charging unit includes several second switches connected in a series with each other and coupled in parallel to a voltage converting unit and the second charging unit, and
wherein the pre-charging unit is configured to be repeatedly activated and deactivated to pre-charge the first charging unit with the provided voltage to a voltage value equal to a first threshold value, and wherein the pre-charging unit is configured to reduce a surge current from being conducted from the voltage source to one or more capacitors of the first charging unit responsive to activation of the one or more first switches, the pre-charging unit configured to reduce the surge current by pre-charging the one or more capacitors in the first charging unit prior to the activation of the one or more first switches.

11. A method for interfacing a traction load to a voltage source, the method comprising:
deactivating one or more first switches to decouple a first charging unit of a trolley interfacing device from the voltage source;
activating a pre-charging unit of the trolley interfacing device to energize at least one inductor in a second charging unit of the trolley interfacing device, wherein the pre-charging unit includes several second switches connected in a series with each other and connected in parallel to the second charging unit; and
deactivating the pre-charging unit to provide a voltage across the at least one energized inductor to the first charging unit when the one or more first switches is deactivated to decouple the voltage source from the first charging unit, wherein the first charging unit is pre-charged with the provided voltage to charge the first charging unit and prevent conduction of a surge current flow from the voltage source to the first charging unit while the first charging unit is operatively coupled to the voltage source by activating the one or more first switches.

12. The method of claim 11, further comprising coupling the second charging unit to a DC bus for charging the second charging unit with a voltage across the DC bus.

13. The method of claim 11, further comprising pre-charging the first charging unit with the provided voltage to a voltage value equal to a first threshold value.

14. The method of claim 13, further comprising coupling the first charging unit of the trolley interfacing device to the voltage source after pre-charging the first charging unit with the voltage equal to the first threshold value.

15. A system for driving a traction load, the system comprising:
a trolley interfacing device disposed between a voltage source and the traction load and configured to step down a DC voltage supplied from the voltage source to the traction load, wherein the trolley interfacing device comprises:
a first charging unit including one or more capacitors, the first charging unit configured to be coupled in parallel to the voltage source through one or more first switches;
a second charging unit comprising at least one inductor that is configured to be coupled in parallel to the traction load;
a pre-charging unit including several second switches connected in a series with each other, the series of the second switches configured to be coupled in parallel to the second charging unit; and
a voltage converting unit configured to be disposed between the first charging unit and the second charging unit, the voltage converting unit configured to step down a voltage provided by the voltage source to the traction load responsive to activation of the one or more first switches to couple the voltage source to the first charging unit through the one or more first switches, wherein the pre-charging unit is configured to reduce a surge current being conducted from the voltage source to the one or more capacitors of the first charging unit responsive to activation of the one or more first switches, the pre-charging unit configured to reduce the surge current by pre-charging the one or more capacitors in the first charging unit prior to the activation of the one or more first switches.

16. The system of claim 15, wherein the pre-charging unit is configured to energize the at least one inductor in the second charging unit.

17. The system of claim 16, wherein the pre-charging unit is configured to provide the voltage across the at least one energized inductor to pre-charge the first charging unit.

18. The system of claim 17, wherein the pre-charging unit is configured to be repeatedly activated and deactivated to pre-charge the first charging unit with the provided voltage to a voltage value equal to a first threshold value.

* * * * *